United States Patent [19]

Kim

[11] Patent Number: 4,605,888
[45] Date of Patent: Aug. 12, 1986

[54] STARTING WINDING SWITCHING CIRCUIT FOR SINGLE-PHASE INDUCTION MOTORS

[76] Inventor: In S. Kim, 134-21, Cheongdam-dong, Apart 10-dong 615, Kangnam-ku, Samig, Rep. of Korea

[21] Appl. No.: 657,361

[22] Filed: Feb. 17, 1984

[30] Foreign Application Priority Data

Feb. 21, 1983 [KR] Rep. of Korea .................... 1983 692

[51] Int. Cl.$^4$ ............................................. H02P 1/64
[52] U.S. Cl. ..................................... 318/786; 318/785
[58] Field of Search ........................ 318/786, 785, 789

[56] References Cited

U.S. PATENT DOCUMENTS

| 4,366,426 | 12/1982 | Turles | 318/786 |
| 4,399,394 | 8/1983 | Ballman | 318/786 |
| 4,468,604 | 8/1984 | Zaderej | 318/786 |

Primary Examiner—David Smith, Jr.
Attorney, Agent, or Firm—Banner, Birch McKie & Beckett

[57] ABSTRACT

The switching device of the present invention electrically connects a single-phase induction motor's starting winding to the motor's circuitry upon start-up, and disconnects it once the motor reaches a first predetermined speed. If the motor's speed drops below a second predetermined speed, the switching device reconnects the starting winding to the motor's circuitry until the motor again reaches the first predetermined speed. At start-up, diode bridge D1 turns ON, turning ON SCR S2. With the SCR ON, the diode bridge is short-circuited, drawing a large current through the bridge's a.c. side. This current flows through resistor R8, and the voltage drop across R8 is large enough to turn triac S1 ON. Thus, current flows through starting coil L2. When the motor reaches a first predetermined speed, the voltage across the starting coil is large enough to turn NPN transistor TR2 ON, turning PNP transistor TR1 ON. Accordingly, the SCR turns OFF, eliminating the large current drawn through the a.c. side of the diode bridge, and the triac turns OFF. If the motor speed dips below a second predetermined value, lower than the first, transistor TR1 is cutoff, and the triac subsequently turns back ON until the first predetermined speed is reached.

2 Claims, 2 Drawing Figures

STARTING WINDING SWITCHING CIRCUIT FOR SINGLE-PHASE INDUCTION MOTORS

BACKGROUND OF THE INVENTION

1. Technical Field

The present invention relates to the field of single-phase induction motors, and more particularly to a switching device for electrically connecting and removing the starting winding from the single-phase induction motor's circuitry.

2. Background Information

Single-phase induction motors, as are well known to those skilled in the art, typically comprise a distributed stator main winding, an auxiliary winding, and a squirrel-cage rotor. As discussed in the Del Toro's test *Electromechanical Devices For Energy Conversion And Control Systems*, Prentice-Hall, Inc. 1968, pps. 360-90, an a.c. supply voltage applied only to the stator winding creates a field fixed in space and alternating in magnitude. The field therefore produces no starting torque on the rotor. This condition, however, prevails only at rotor standstill. If, by some means, the rotor is started in either direction, it will develop a nonzero net torque in that direction and thereby cause the motor to achieve synchronous speed.

The typical non-mechanical method of starting a single phase induction motor is to temporarily include a second, auxiliary winding around the rotor to produce a revolving field of constant amplitude and constant linear velocity. This revolving field creates the necessary starting torque needed to start the rotor turning on its axis. To obtain this revolving field, the two windings are preferably space-displaced by 90 electrical degrees. Additionally, the current flowing through these windings are preferably time-displaced by 90 electrical degrees and the windings must have such magnitudes that the mmf's are equal.

The space-displacement criterion is met by placing the auxiliary winding in the stator with its axis in quadrature with that of the main winding. Typically, the main winding occupies two-thirds of the stator slots, with the auxiliary winding occupying the remaining one-third.

The time displacement criterion regarding the currents through the two windings is at least partially obtained by designing the auxiliary winding for high resistance and low leakage reactance. This is in contrast to the main winding which typically has lower resistance and higher leakage reactance. Due to the high-resistance characteristic and the short time power rating inherent in the auxiliary winding, they must be removed from the line once a sufficient percentage of synchronous speed is reached.

One prior art method for removing the auxiliary winding from the line is by a cut-off switch, placed in the auxiliary winding circuit, which by centrifugal action electrically removes the auxiliary winding from the line when the motor speed obtains a certain percentage of synchronous speed. However, due to the large current flow and the switching action, the centrifugal switch contacts become damaged over time due to arcing. This is disadvantageous because the auxiliary winding could burn itself out if the switch becomes faulty. Additionally, since the switch resides on the motor, it is difficult to miniaturize the overall motor size.

Another prior art method for removing the auxiliary winding from the line involves replacing the centrifugal action switch with a triac-based circuit, wherein the triac is controlled based on the current in the main stator winding. However, because the current which flows through the main winding changes with load characteristics, this method is complex and inherently limited to a small range of applications.

SUMMARY OF THE INVENTION

Accordingly, it is an object of the present invention to design a circuit for electrically removing the auxiliary winding of a single-phase induction motor from the line using a triac-based circuit, wherein the triac is controlled by the voltage across the auxiliary winding.

It is also an object of the present invention to design the circuit such that the circuit does not impede the operation of the motor at either start-up or during synchronous operation.

It is further an object of the present invention to design the circuit such that it is economic in design and easy to manufacture.

The invention relates to a switching device for electrically connecting a starting winding in a single-phase induction motor from initial start-up until the motor has achieved a first predetermined speed, at which point the device electrically removes the starting winding from the motor's circuitry. Should the motor's speed drop below a second predetermined speed, the switching device will electrically reconnect the starting winding to the motor's circuitry until the motor again achieves the first predetermined speed.

The switching device comprises a triac in series with the motor's starting winding. Connected across the triac is the a.c. side of a diode bridge. The d.c. side of the diode bridge includes a silicon control rectifier (SCR) controlled by a voltage control circuit connected in parallel across the motor's starting winding.

At start-up, the voltage drop across the starting winding is small, therefore the voltage control circuit also receives a small voltage drop, and the voltage control circuit is essentially off. The a.c. voltage across the diode bridge produces sufficient voltage on its d.c. side to turn the SCR on, thereby effectively shorting out the d.c. side of the diode bridge. Due to this short, a large current is drawn through the a.c. side of the diode bridge. A resistor, in series with the a.c. side of the diode bridge and connected to the gate terminal of the triac, produces a voltage drop large enough to turn the triac on. Since the triac is in series with the starting coil, current flows through the starting coil, producing sufficient torque to start the motor.

When the motor reaches the first predetermined speed, the voltage drop across the starting coil, and hence the voltage control circuit, is large enough to turn the voltage control circuit on, thereby turning the SCR off. With the SCR off, the large current drain on the a.c. side of the diode bridge is no longer present. Thus, the potential voltage across the resistor, in series with the a.c. side of the diode bridge, decreases. This decreased voltage is not sufficient to keep the triac on. Accordingly, the triac turns off and the starting winding is electrically removed from the motor's circuit.

If the motor's speed should drop below a second predetermined speed, lower than the first predetermined speed, the voltage control circuit again effectively turns off, due to the low voltage across both it and the starting winding. The SCR will turn back on, shorting out the d.c. side of the diode bridge, and the triac will again turn on, reconnecting the starting winding to the motor's circuit. The voltage control circuit in the present invention comprises a series of transistors. By taking advantage of their different saturation and cutoff voltage levels, a hysteresis characteristic is available for motor control applications.

Accordingly, the switching circuit of the present invention includes a hysteresis characteristic which takes the starting winding out of the motor's circuit once the motor reaches a first predetermined speed, but does not reconnect the starting coil until the motor falls below a second, lower, predetermined speed. The obvious advantages of this hysteresis characteristic will be appreciated by those skilled in the art.

DETAILED DESCRIPTION OF THE PREFERRED EMBODIMENTS

Figure 1:
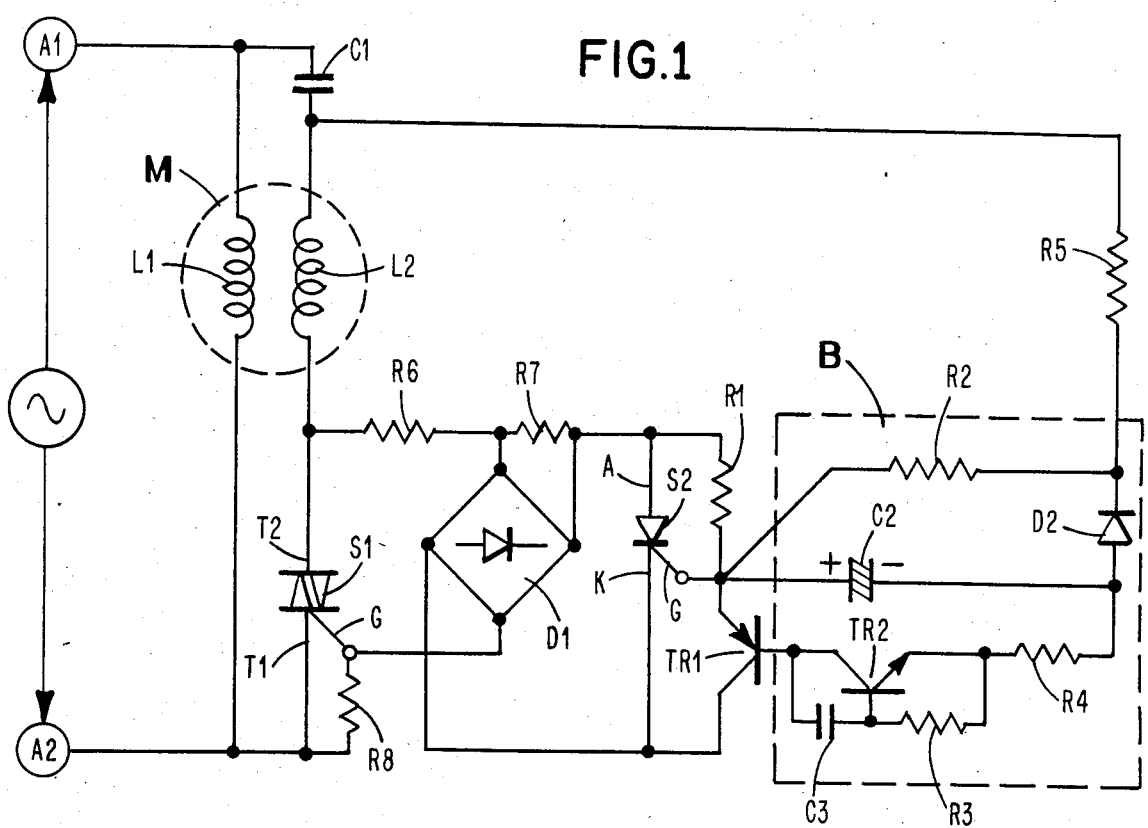
FIG. 1 shows the preferred embodiment of the starting coil switching circuit of the present invention.

Turning now to FIG. 1, the preferred embodiment of the starting coil switching circuit of the present invention is shown.

When an a.c. voltage is first applied to terminals A1 and A2 of motor M, a voltage is applied to diode bridge D1 through starting capacitor C1, starting coil L2, and resistor R6 on one side, and resistor R8 on the other side. The diode bridge outputs positive rectified voltage to anode A of silicon control rectifier (SCR) S2 and a reference voltage to cathode K of the SCR. The positive rectified voltage also sets up a current applied to gate G of the SCR through resistor R1, thereby turning the SCR ON.

When the SCR is ON, the diode bridge is short-circuited on its d.c. side through the SCR, and this short circuit causes a large current to flow through the a.c. side. This large current goes through resistor R8, maintaining a large voltage drop at the triac's gate G, thereby turning the triac ON. The triac therefore electrically connects the starting coil in the motor's circuitry, allowing current to flow therethrough, and producing sufficient starting torque to start the rotor spinning.

The induced voltage across the starting winding is directly proportional to the rotational velocity of the motor. Thus, at start-up, the voltage across the starting winding is small. Thus, the voltage across capacitor C2 is small. This voltage is not enough to turn ON NPN transistor TR2. Therefore, as no base current is supplied to PNP transistor TR1, it also remains OFF.

Once the motor reaches a first predetermined percent speed of synchronous speed, the voltage drop across the starting winding increases, increasing the voltage drop across capacitor C2. The increased voltage drop across C2 causes the NPN transistor to turn ON, supplying the PNP transistor with adequate base current to saturate the PNP transistor. Thus, the SCR's gate current flows through the PNP transistor TR1. In the preferred embodiment, the value of resistor R1 is relatively high so that the voltage drop across R1 is not sufficient to keep the SCR turned ON, and it subsequently draws no current. With the SCR OFF, since the resistance value of resistor R1 is high, a lower current is drawn on the d.c. side of the diode bridge. Thus, a lower current draw is reflected to the a.c. side of the diode bridge. Accordingly, the voltage across the gate of the triac is not sufficient to keep the triac ON, and therefore the triac turns OFF. Accordingly, the starting coil is electrically disconnected from the motor's circuitry. Although the starting coil is effectively removed, the starting torque initially produced allows the rotor to reach synchronous speed by the flux created in the main winding.

In the preferred embodiment, the values of the components are chosen so that transistor TR1 turns on when the motor reaches about 60% synchronous speed (about 70 volts) and is cut-off when the motor's speed drops below about 40% synchronous speed (about 40 volts). Accordingly, control circuit B connects the starting coil to the motor's circuit until the motor reaches at least 60% synchronous speed, at which point the triac is turned off and the starting coil is electrically removed from the circuit. When the motor's speed dips below about 40% synchronous speed, the triac is turned back on, reconnecting the starting coil, as will now be explained.

If the motor should experience a load such that its speed dips below about 40% synchronous speed, transistor TR2 is cut OFF thereby turning transistor TR1 OFF. Accordingly, the voltage potential at R1 turns the SCR back on, short-circuiting the d.c. side of the diode bridge, causing a large current draw on the a.c. side. This large current through resistor R8 produces a large enough voltage drop to turn the triac back ON, electrically reconnecting the starting coil in the circuit.

As has been described, control circuit B and transistor TR1 have a hysteresis characteristic which disconnect the starting coil from the single phase induction motor once the motor attains at least 60% synchronous speed, and reconnects the starting coil when motor drops below about 40% synchronous speed.

Figure 2:
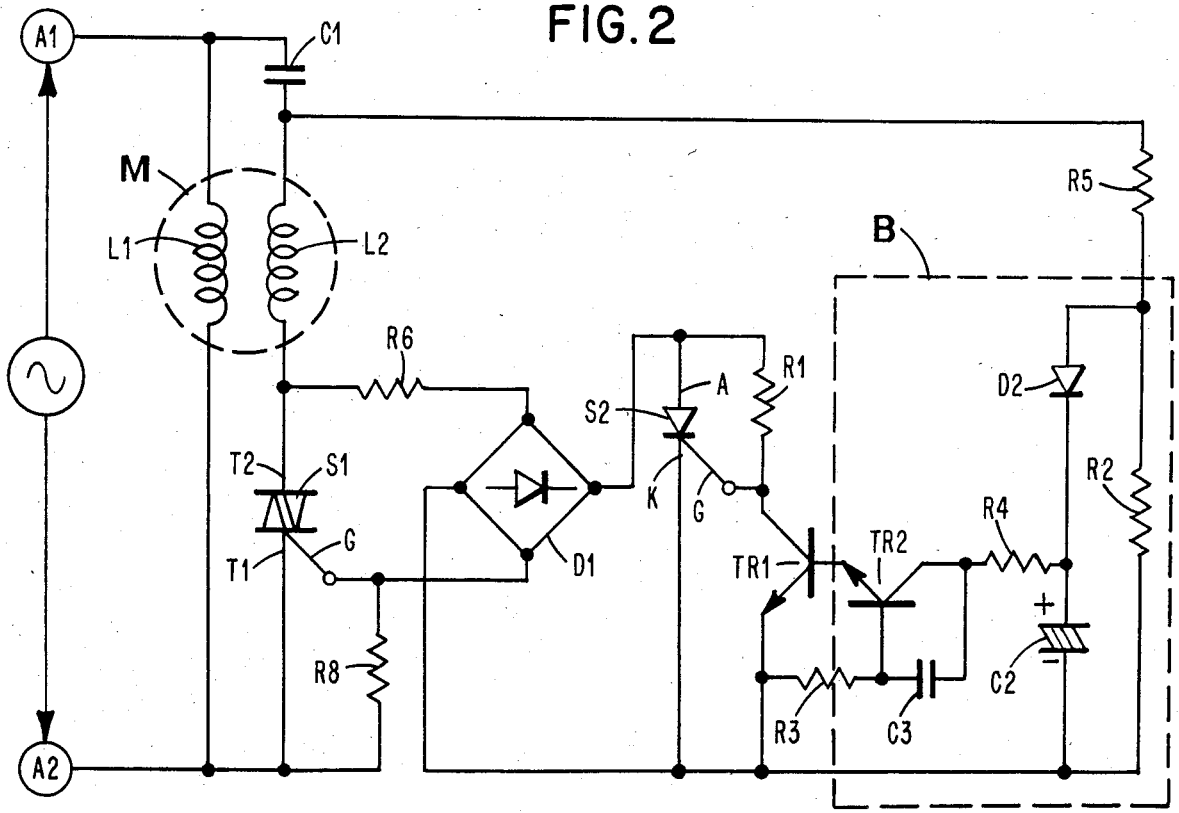
FIG. 2 shows another embodiment of the starting coil switching circuit of the present invention.

Turning now to FIG. 2, another embodiment of the starting coil switching circuit of the present invention is shown.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What is claimed is:

1. A switching device for use with a single phase induction motor having a main winding, and a starting winding in series with a starting capacitor, connected in parallel across first and second supply terminals, said switching device comprising:

a triac having first, second and gate terminals, said triac's first terminal connected to one terminal of the the starting winding, and said triac's second terminal connected to the second supply terminal;

a diode bridge having first and second a.c. terminals and first and second d.c. terminals, said first d.c. terminal outputting a reference potential and said second d.c. terminal outputting a positive rectified potential, said second a.c. terminal connected to said triac's gate terminal;

a first resistor connected between said triac's first terminal and said diode bridge's first a.c. terminal;

a second resistor connected between said triac's second terminal and said triac's gate terminal;

a silicon control rectifier (SCR) having anode, cathode and gate terminals, said SCR's anode terminal connected to said diode bridge's second d.c. terminal, and said SCR's cathode terminal connected to said diode bridge's first d.c. terminal;

a third resistor connected between said diode bridge's first a.c. terminal and said SCR's anode terminal;

a fourth resistor connected between said SCR's anode terminal and said SCR's gate terminal;

a PNP transistor having emitter, collector and base terminals, said PNP transistor's emitter terminal connected to said SCR's gate terminal, and said PNP transistors collector terminal connected to said SCR's cathode terminal;

an NPN transistor having emitter, collector and base terminals, said NPN transistor's collector terminal connected to said PNP transistor's base terminal;

a first capacitor connected between said NPN transistor's collector terminal and said NPN transistor's base terminal;

a fifth resistor connected between said NPN transistor's base terminal and said NPN transistor's emitter terminal;

a diode having anode and cathode terminals;

a sixth resistor connected between said NPN transistor's emitter terminal and said diode's anode terminal;

a second capacitor connected between said PNP transistor's emitter terminal and said diode's anode terminal;

a seventh resistor connected between said PNP transistor's emitter terminal and said diode's cathode terminal; and an eighth resistor connected between said diode's cathode terminal and the other terminal of the starting winding.

2. A switching device for use with a single phase induction motor having a main winding, and a starting winding in series with a starting capacitor, connected in parallel across first and second supply terminals, said switching device comprising:

a triac having first, second and gate terminals, said triac's first terminal connected to one terminal of the the starting winding, and said triac's second terminal connected to the second supply terminal;

a diode bridge having first and second a.c. terminals and first and second d.c. terminals, said first d.c. terminal outputting a reference potential and said second d.c. terminal outputting a positive rectified potential, said second a.c. terminal connected to said triac's gate terminal;

a first resistor connected between said triac's first terminal and said diode bridge's first a.c. terminal;

a second resistor connected between said triac's second terminal and said triac's gate terminal;

a silicon control rectifier (SCR) having anode, cathode and gate terminals, said SCR's anode terminal connected to said diode bridge's second d.c. terminal, and said SCR's cathode terminal connected to said diode bridge's first d.c. terminal;

a third resistor connected between said SCR's anode terminal and said SCR's gate terminal;

a first NPN transistor having emitter, collector and base terminals, said first NPN transistor's collector terminal connected to said SCR's gate terminal, and said first NPN transistor's emiter terminal connected to said SCR's cathode terminal;

a second NPN transistor having emitter, collector and base terminals, said second NPN transistor's emitter terminal connected to said first NPN transistor's base terminal;

a first capacitor connected between said second NPN transistor's collector terminal and said second NPN transistor's base terminal;

a fourth resistor connected between said second NPN transistor's base terminal and said first NPN transistor's emitter terminal;

a diode having anode and cathode terminals;

a fifth resistor connected between said second NPN transistor's collector terminal and said diode's cathode terminal;

a second capacitor connected between said first NPN transistor's emitter terminal and said diode's cathode terminal;

a sixth resistor connected between said first NPN transistor's emitter terminal and said diode's anode terminal; and a seventh resistor connected between said diode's anode terminal and the other terminal of the starting winding.

* * * * *